June 28, 1932.    A. C. BOOCK    1,864,518
SHAFT MOUNTING MEANS
Filed Dec. 16, 1927
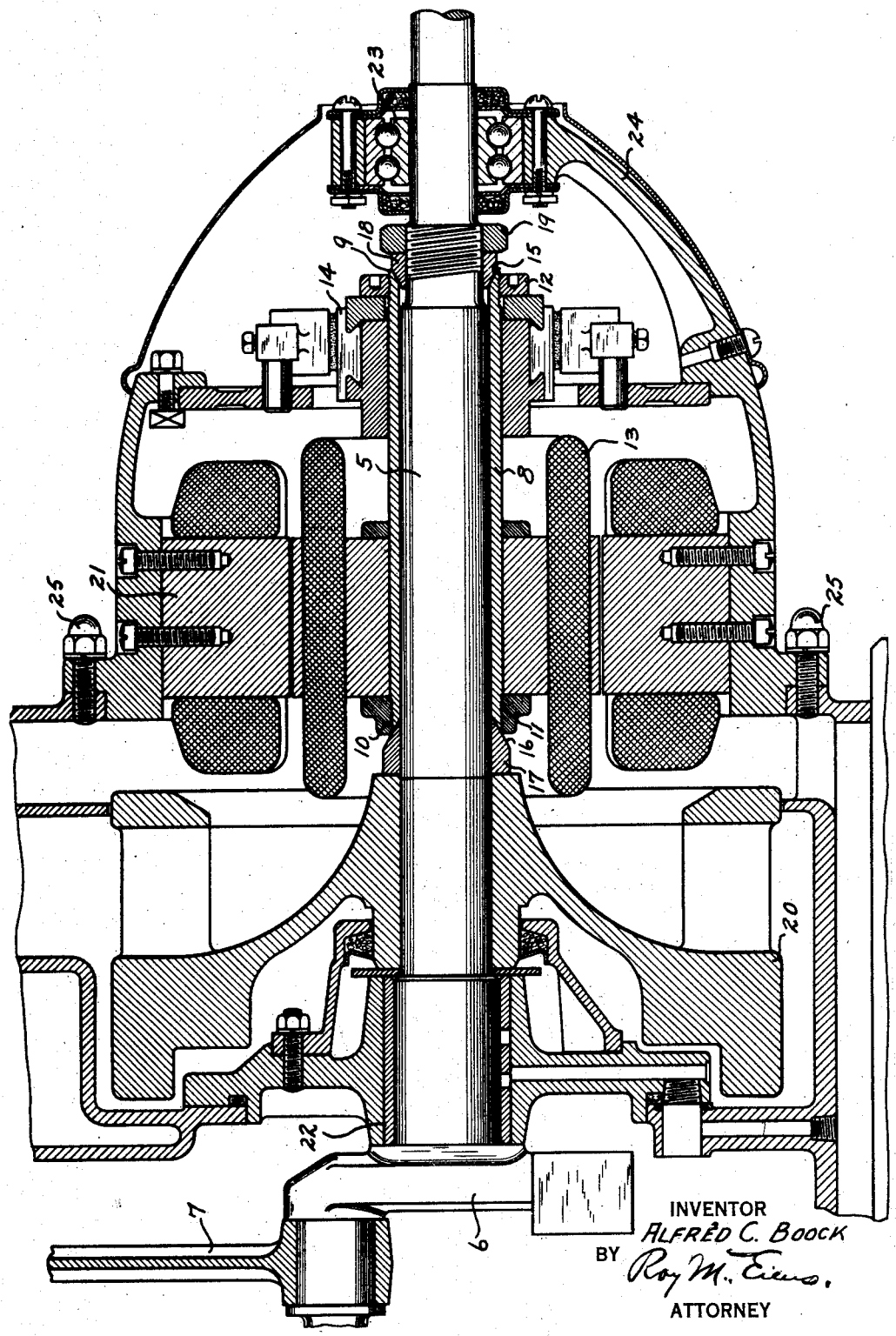
INVENTOR
*ALFRED C. BOOCK*
BY
*Roy M. Evens*
ATTORNEY Patented June 28, 1932

1,864,518

UNITED STATES PATENT OFFICE

ALFRED C. BOOCK, OF BELOIT, WISCONSIN, ASSIGNOR TO FAIRBANKS, MORSE & CO., OF CHICAGO, ILLINOIS, A CORPORATION OF ILLINOIS

SHAFT-MOUNTING MEANS

Application filed December 16, 1927. Serial No. 240,466.

This invention relates to improvements in shaft-mounting means, and particularly to an improved arrangement for removably securing a rotating member onto a shaft by which the rotating member is carried.

The object of my invention is to provide a mounting means whereby a shaft-carried member may be quickly and easily assembled to the shaft after complete manufacture and machining of the separate elements, and whereby this mounting means serves to strengthen and reinforce the shaft, thus permitting the use of a smaller and lighter shaft.

The usual practice in mounting a comparatively heavy rotating member on a shaft, is to use a shaft of sufficient dimensions and weight to provide for the maximum stress at the point where this heavy member is placed. By the use of my device the shaft is strengthened at the weight bearing points by an amount sufficient to provide for the added stress imposed at those points, and without the use of any extra material in the shaft. The use of my device effects the advantages of constant-strength members, without their usual disadvantages of manufacture and cost.

My device provides a practical means of separately machining a shaft, and manufacturing and assembling the member to be mounted thereon. Each may be completely, separately finished, and less time and skill required in assembling the finished unit. A further advantage is found in the ease of repair and replacement of either the shaft or the mounted member, while in service.

By way of illustration I show my device as applied to the mounting of a generator armature adapted to be direct-driven by a prime mover, such as an internal combustion engine. The arrangement is, however, equally applicable to any combination of a shaft and shaft-carried member.

By using a mounting member which fits tightly on the shaft, it will appear that, in the example described, the sleeve serves effectively to reinforce the crankshaft and to reduce deflection ordinarily caused by reciprocating parts and intermittent power strokes of the engine. This feature is of great importance where the engine is small, and has but one or few cylinders. It is especially advantageous in a direct-connected engine-generator unit having a single crankshaft bearing adjacent the crank, and thus provided with an overhung crankshaft; such a construction being impossible in many cases without the use of my device. My device is especially practical in the mounting of armatures or rotors in electrical machines, where permissible deflections are small.

Although my invention consists largely in the construction and arrangement of parts hereinafter described and particularly pointed out in the claims, yet I do not limit my invention to the precise form or construction of parts shown or the several parts thereof, inasmuch as various alterations may be made without changing the scope of my invention.

Referring to the drawing, the figure represents a sectional elevation of an approved form of my device as applied to the armature and shaft of a direct-driven engine-generator unit, the example shown being an application of my device to an overhung crankshaft.

Referring by numerals to the drawing, 5 represents a preferred form of a shaft, which may be driven in the usual manner by crank 6 and connecting rod 7. 8 represents a sleeve, preferably carried by the shaft 5, and which preferably fits closely on the shaft. Upon each end of the sleeve 8 are formed threaded portions 9 and 10. Nuts 11 and 12 co-operate with the threaded portions to attach armature 13, and a commutator 14 to the sleeve. Nut 12 may also be provided with spanner wrench notches as shown. The above described parts, thus formed, provide a completely assembled unit. At each end of the sleeve 8 are formed recessed or beveled portions 15 and 16, which preferably conform in slope with the bevels on the washer or nut 17 and wedge washer 18. The sleeve 8 and its accompanying parts are then secured rigidly to shaft 5 by means of the wedge washer 18 and the nut 19 which serve securely to press the inner end of the sleeve against washer or nut 17. Nut 19 may also be employed for holding a fly wheel 20 in place. 21 represents the usual generator pole pieces, which may be of any suitable form. At 22 is shown a bearing of any suitable type, here shown as a combined engine crank-shaft bearing and generator bearing. The generator end bearing shown at 23, is of any suitable type, and is shown carried by the generator frame 24. Where a flywheel is desirable in the assembly, it may be mounted as indicated by 20.

In operation, shaft 5 is greatly strengthened and stiffened by sleeve 8, and to a certain extent by the armature thereon, enabling the operation of the assembly with a minimum of deflection of the shaft. Clearance between the armature and pole pieces is kept practically constant; even when a high-compression, explosion engine is direct connected as a source of power. In such an assembly, any tendency toward crank-shaft whip is eliminated, and vibration minimized.

The particular construction of the sleeve, the arrangement of the armature and commutator upon the sleeve, etc., as described above, provide for extreme simplification of assembly operations, and also will facilitate removal of a part from the assembly. For example, a burned-out armature may be replaced. The entire generator frame, field windings and end bearing are detachable as a unit, from the engine crankcase, by the removal of the bolts 25. By the removal of nut 19, wedge washer 18 is freed from the shaft, and the armature, commutator and sleeve may be easily withdrawn for repair or substitution.

In other types of construction it is often necessary to remove the entire crankshaft, armature, etc., which entails a great loss of operating time, and repair expense.

I claim as my invention:

1. As a mounting means for the rotor of an electric machine, a shaft, a sleeve between the rotor and the shaft, closely surrounding the shaft between the ends of the rotor, means for securing the sleeve to the shaft, said means comprising a collar of wedge section, holding means for the collar, and a flared recessed seat for the collar, formed by one end of said sleeve, and means for detachably securing the rotor to the sleeve, including threaded collars carried by opposite ends of the sleeve, and engaging opposite ends of the rotor.

2. In an electric machine, including an armature and armature shaft, a reinforcing sleeve closely fitted to said shaft, and extending substantially between opposite ends of the armature, and serving to mount, as a unit, the armature of said machine on said shaft, said sleeve having tapered internal frictional surfaces at its ends, frictional holding elements having beveled portions extending into engagement with said friction surfaces and between the sleeve and shaft, one of said holding elements being adjustably movable endwise of the sleeve and shaft, and threaded elements externally engaging the sleeve and armature at their opposite ends, and surrounding the ends of said sleeve.

3. In combination with a dynamo electric machine and a shaft therefor, an armature arranged to rotate with said shaft, a sleeve, closely surrounding the shaft and constituting a mounting member for the armature as a unit, the sleeve being provided with undercut ends, a pair of oppositely presented collars, disposed at the ends of the sleeve and each having a portion of tapered section extending in expanding relation between the shaft and one end of the sleeve, one of said collars being positioned, and one threadedly movable along, the shaft, and threaded collars disposed externally at opposite ends of the sleeve and armature, and adapted detachably to secure the armature to the sleeve, and to restrict the expanding action of said tapered collars.

ALFRED C. BOOCK.